W. N. VENNER.
APPARATUS FOR MACHINING HELICAL SURFACES.
APPLICATION FILED APR. 6, 1906.

1,001,908.

Patented Aug. 29, 1911.

2 SHEETS—SHEET 1.

Witnesses
B. Sommers
M. E. Beall.

Inventor
William Nunn Venner
by Henry Orth Jr.
Atty

W. N. VENNER.
APPARATUS FOR MACHINING HELICAL SURFACES.
APPLICATION FILED APR. 6, 1906.
1,001,908.
Patented Aug. 29, 1911.
2 SHEETS—SHEET 2.
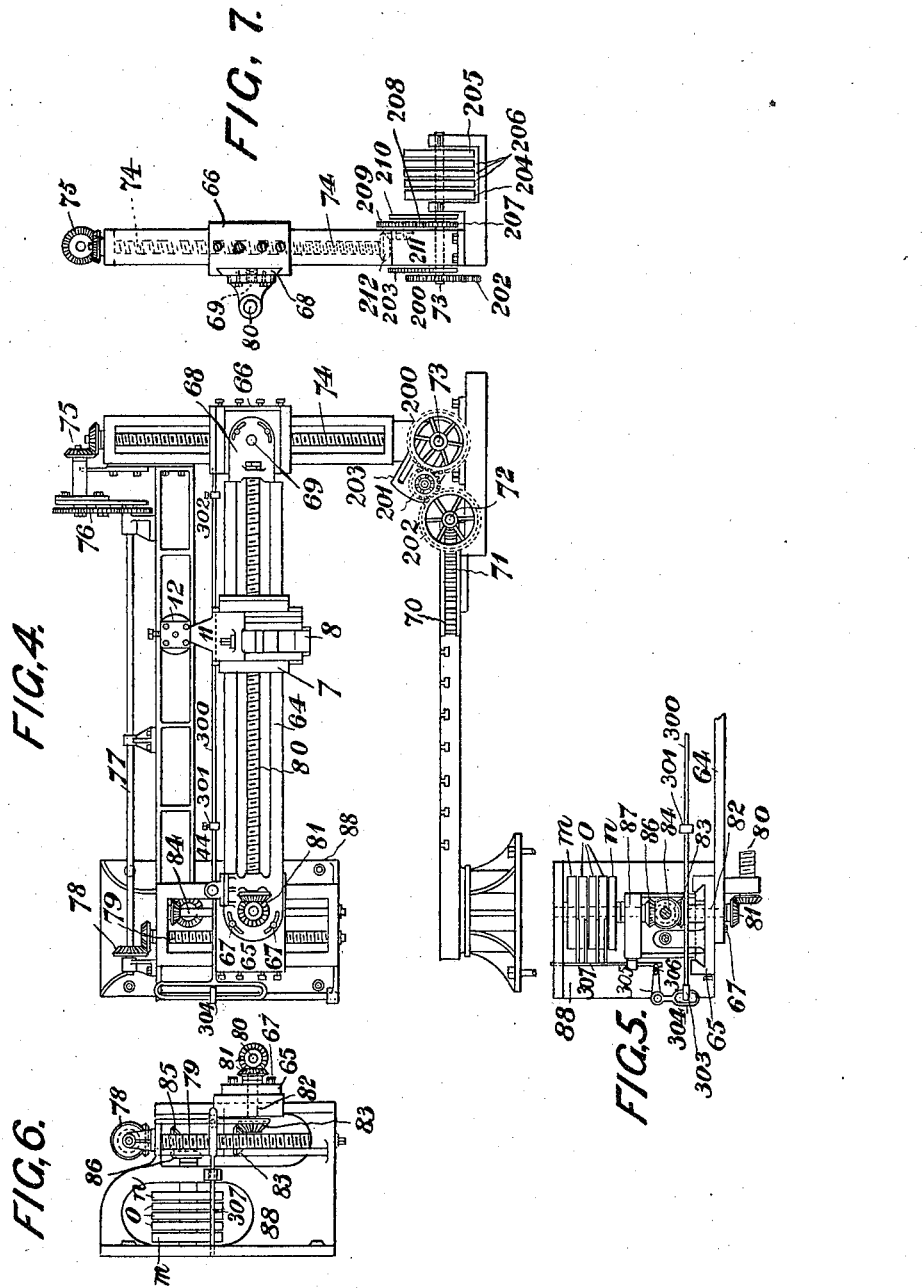

UNITED STATES PATENT OFFICE.

WILLIAM NUNN VENNER, OF BROCKLEY, ENGLAND.

APPARATUS FOR MACHINING HELICAL SURFACES.

1,001,908. Specification of Letters Patent. Patented Aug. 29, 1911.

Application filed April 6, 1906. Serial No. 310,370.

*To all whom it may concern:*

Be it known that I, WILLIAM NUNN VENNER, a subject of the King of Great Britain, residing at 28 Rokeby road, Brockley, in the county of Kent, England, have invented new and useful Improvements in Apparatus for Machining Helical Surfaces, of which the following is a specification.

This invention relates to improved apparatus for machining large helical surfaces such as propellers or propeller blades in which the tool is carried on a saddle adapted to slide on a cross rail which has movement in the vertical plane on a standard or standards the said movement being communicated by means of positive gearing while the work is mounted on a table adapted to oscillate, the tool being mounted on the aforesaid saddle and cutting in the direction of the pitch, while the feed of the tool is in the radial direction or the saddle on which the tool is mounted may reciprocate on the cross rail so that the cut may be in the radial direction while the feed is in the direction of the pitch and the table is caused to revolve slowly.

The improved construction and combination according to the present invention will be hereinafter described with reference to the accompanying drawings and pointed out in the claims.

Figure 1:
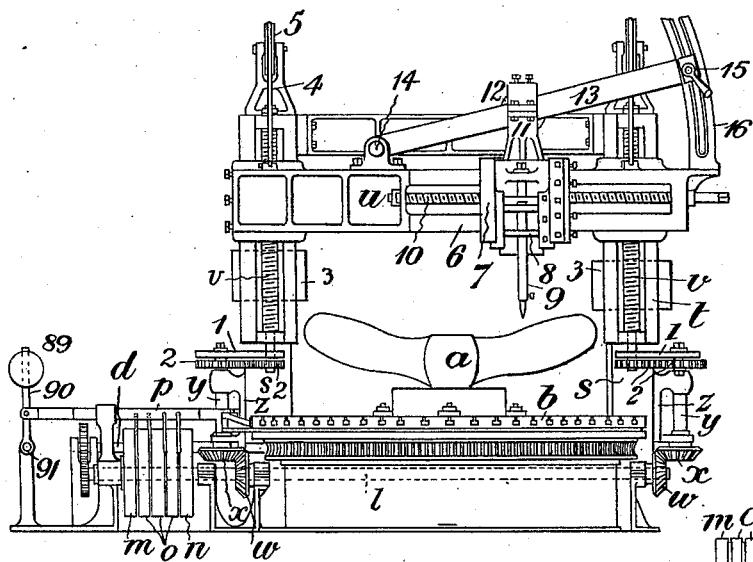
Figure 3:
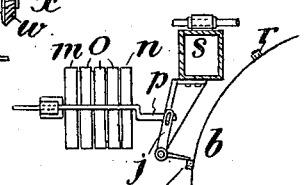
Figure 2:
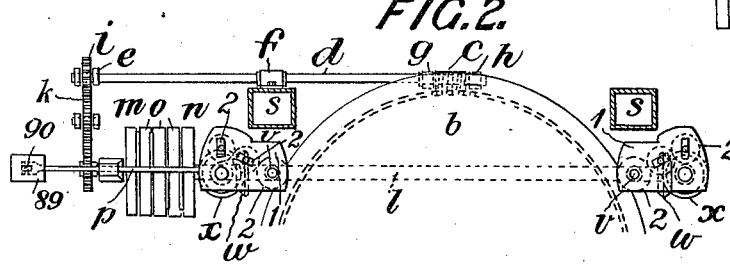

Figure 1 of the accompanying drawings illustrates in elevation an apparatus constructed according to this invention in which the cut is taken in the direction of the pitch, the tool is caused to be fed in the radial direction and the work is caused to oscillate. Fig. 2 is a plan thereof and Fig. 3 is a detail also in plan showing the means for reversing the directions of partial revolution of the bed. Fig. 4 is an elevation of a modified form of apparatus and Fig. 5 is a plan section. Fig. 6 is a left hand side view of part of said apparatus and Fig. 7 is a side view of the right hand end of Fig. 4.

In carrying the invention into effect the work such as a propeller $a$ and as shown in Figs. 1 and 2, is mounted on a circular bed or table $b$ having a worm wheel on its periphery and adapted to revolve or oscillate by means for instance of a worm $c$ (see Fig. 2) on a shaft $d$ mounted in bearings $e\ f\ g$ and $h$, which shaft by means of spur wheels $i$ and $k$ receives motion from the main driving shaft $l$. The latter has fast pulleys $m$ and $n$ and loose pulleys $o$ and by a straight and a cross belt is adapted to revolve in either direction according to the position of the strap shifting rod $p$ and means are provided such as adjustable stops $q$ and $r$ (see also Fig. 3) on the said table $b$ to cause the driving belts of the machine to be shifted as required by means of the bell crank lever $j$ which is pivoted on a bracket fixed to a standard $s$ and connected to the strap shifting rod $p$, well known means being provided for causing the rapid movement of the strap shifting rod each time it is operated such as for instance a weight 89 mounted on a lever 90 pivoted to the bracket 91 so that the bed may oscillate backward and forward on its axis, or clutches and reversing gear may be employed if desired, or instead of the bed being circular it may be partly circular. Mounted at each side of the bed are the two standards $s\ s$, Figs. 1 and 2, one on each side, (only one being shown in the detail Fig. 3) having V guides $t\ t$ or being otherwise suitably fashioned and on these standards is mounted a movable cross rail $u$ adapted to slide up and down by means of screws $v\ v$ and nuts connected to said cross rail, but not shown, which screws $v\ v$ receive revolving motion in either direction from the driving shaft $l$ in any well known or convenient manner, such as for instance by means of miter wheels $w\ w$ mounted on the shaft $l$ and gearing with other miter wheels $x\ x$ keyed to two short shafts $y\ y$ mounted in bearings in brackets $z\ z$. At the upper end of each of these short shafts $y$ is mounted a quadrant 1 adapted to receive spur change wheels 2 of various dimensions adapted to gear with each other and to communicate motion at various speeds in the well known manner to each of the screws $v$.

Preferably the weight of the cross rail $u$ is more or less balanced by counterweights 3 connected to the cross rail by chains 4 passing over pulleys 5 to facilitate the driving, but this is not essential. The cross rail $u$ is also provided with V-guides 6 on which slides a saddle 7 having a slide thereon on which is mounted a slide rest 8 in which the tool 9 is clamped. The saddle is adapted to slide backward and forward to give the feed as the work oscillates below, by means for instance of a nut in the saddle (not shown)

through which passes a screw 10 and means of any suitable construction are provided for a self-acting feed by gearing from the main shaft, or independently thereof. Means are provided in connection with the cross rail to cause the tool which is mounted in the saddle to approach and recede automatically from the work table as such tool traverses the table in one direction or the other. In Fig. 7 this means consists in connecting the slide which is marked 11 by a pivoted guide 12 to an adjustable pivoted straight or curved bar 13, which bar is also pivotally mounted at 14 on the cross rail $u$ and provided with means such as a screw clamp 15 and a slotted quadrant 16 fixed to the said cross rail, for clamping it in the horizontal position or at any required angle thereto so that the tool 9 may either travel with the saddle 7 and describe a path parallel thereto, or so that it may describe a path at an angle thereto, all according whether the bar 13 is parallel or at an angle to the cross rail. Or if desired, and as will be clearly shown in one of the modifications to be presently described, the cross rail may be provided with means for varying its position so that it either lies in a horizontal plane or in a plane at an angle thereto, the object being to permit of machining propeller blades (such as those of the propeller shown) which lean aft. The pitch or curves of the blade will be uniform when machined by an apparatus of this construction because the screws $v$ are intended to revolve at the same speed but if the apparatus be slightly modified as will be described with reference to some of the modifications the pitch may be made variable by communicating motion to the moving parts by variable gear so that one screw $v$ revolves at a different speed from the other screw $v$.

In the modification shown in Figs. 4 to 7 the means provided in connection with the cross rail to cause the tool which is mounted in the saddle to approach and recede automatically from the work table as such tool traverses the table is as follows:—The cross rail 64 is pivoted at one end to a saddle 65 and it may be locked thereto by clamping screws 67. At the other end the cross rail is pivoted at 69 to a slide 68 adapted to move in V-guides in the saddle 66. The cross rail is adapted to be clamped by means of clamping screws or bolts to the saddle 66 when the said saddle has been moved in relation to the other saddle 65 to give the said cross rail 64 the proper angle to conform with the angle of the "lean aft" which the propeller is to have. Similarly to the construction shown in Figs. 1, 2 and 3 the work is mounted on a table marked 70 which is however adapted to slowly revolve and is for this purpose provided with a rack 71 at its periphery with which gears a worm mounted on the shaft 72 receiving slow motion or slight intermittent motion at the desired speed by means of spur or other change gear 200, 201 and 202 from a shaft 73 the spur wheel 201 being mounted on an adjustable quadrant 203. The saddles 65 and 66 carrying the cross rail suitably receive motion from the shaft 73 by means for instance of fast pulleys 204 and 205 and loose pulleys 206. The shaft 73 also carries a spur wheel 207 which by change speed gear wheels 208 and 209 mounted on an adjustable quadrant 210 communicates motion by miter wheels 211 and 212 to the screw 74 or the latter may receive motion from another shaft driving the shaft 73 or driven therefrom. The said screw 74 passes through a nut in the saddle 66 and by miter wheels 75 and change spur gearing 76 (for permitting of producing the same pitch or different pitches) drives a shaft 77 which by miter gear 78 communicates motion to a screw 79 and from thence to the saddle 65 by means of a nut fixed thereto as in the case of the saddle 66. Motion is suitably communicated to cause the tool saddle 7 to reciprocate on the cross rail 64 by means of a nut in the said saddle through which passes a screw 80 receiving revolving motion by bevel gear 81 from a shaft 82 mounted in the saddle 65 which shaft by bevel gearing 83 receives motion from a shaft 84, the said shaft being provided with a feather way while that bevel wheel of the pair 83 mounted thereon is adapted to slide up and down with the saddle 65 but to revolve with its shaft 84. At the upper end of the latter there is mounted another bevel wheel 85 which gears with a bevel wheel 86 mounted on a shaft 87 having mounted thereon fast and loose pulleys $m$, $n$ and $o$, the whole of the mechanism at this end of the machine being mounted on a bracket or support 88 bolted to a wall or otherwise supported so as to form a standard but so as to leave a clear space below to afford facilities for getting the work on to the table 70 but it is evident that if desired there may be two similar standards instead of one standard and the aforesaid bracket.

In order to cause the saddle 7 to reciprocate the cross rail 64 has sliding in bearings thereon a rod 300 having adjustable stops 301 and 302 which are fixed so as to be struck by the saddle 7 when it reaches each end of its desired stroke, the said rod is provided with a slotted T piece 303, the outer vertical member of which is adapted to slide vertically within the slotted arm of a double armed lever 304 mounted on a bracket 305 fixed to the bracket 88 the other arm of the said lever 304 being also slotted and connected to a lug 306 on the sliding bar 307 of the strap shifting rod which causes the belts to move from the fast pulleys $m$ or $n$ on to the loose pulleys $o$ and on the contrary in the well known manner.

What I claim as my invention, and desire to secure by Letters Patent is:—

1. Apparatus for machining propeller blades and like helical surfaces, comprising in combination, a revoluble work carrying table, driving mechanism therefor, a cross rail, means to raise or lower both ends of said rail simultaneously, a tool saddle supported by the cross rail, traversing mechanism on the cross rail to traverse said saddle, and means in connection with said cross rail to cause a tool in the saddle to approach and recede automatically from the work table as said tool traverses the table in one direction or the other.

2. Apparatus for machining propeller blades and like helical surfaces, comprising in combination, a revoluble work-carrying table, a driving gear therefor, two vertical feed screws, nut members on said feed screws, driving gears for said feed screws, a cross rail supported on said nut members, a lateral feed mechanism on said cross rail, a tool carrying saddle slidably supported by said cross rail, means on said saddle coöperating with said lateral feed mechanism, guiding means in connection with said cross rail adapted to cause a tool in the saddle to approach toward and recede from the work table as said tool traverses the table in one direction or the other, and an adjustment operative upon said guiding means to vary the inclination thereof to the plane of the work table substantially as set forth.

3. Apparatus for machining propeller blades and like helical surfaces, comprising in combination, a revoluble work-carrying table, a driving gear therefor, two vertical feed screws, nut members on said feed screws, driving gears for said feed screws, a cross rail supported on said nut members, a lateral feed mechanism on said cross rail, a tool-carrying saddle slidably supported by said cross rail, means on said saddle coöperating with said lateral feed mechanism, guiding means in connection with said cross rail adapted to cause a tool in the saddle to approach toward and recede from the work table as said tool traverses the table in one direction or the other, an adjusting device operative upon said guiding means to vary the inclination thereof to the plane of the work table, and locking means operating upon said adjusting device substantially as set forth.

4. Apparatus for machining propeller blades and like helical surfaces, comprising in combination, a revoluble work-carrying table, a driving gear therefor, two vertical feed screws, nut members on said feed screws, driving gears for said feed screws, a cross rail supported on said nut members, a lateral feed mechanism on said cross rail, a saddle slidably supported by said cross rail, means on said saddle coöperating with said lateral feed mechanism, a tool carrying slide movable up and down in said saddle, a bar pivotally connected at one end with said rail, a quadrant on said rail adapted to engage the free end of said bar in order that the inclination of said bar to said rail may be varied, and a pivotal sliding connection between said tool slide and said bar, substantially as set forth.

5. Apparatus for machining propeller blades and like helical surfaces, comprising in combination, a revoluble work-carrying table, a driving gear therefor, two vertical feed screws, nut members on said feed screws, driving gears for said feed screws, a cross rail supported on said nut members, a lateral feed mechanism on said cross rail, a saddle slidably supported by said cross rail, means on said saddle coöperating with said lateral feed mechanism, a tool-carrying slide movable up and down in said saddle, a pivot on said rail in about vertical alinement with the axis of revolution of said work table, a bar supported at one end upon said pivot, a quadrant upon said rail, clamping means adapted to secure the opposite end of said bar at any point on said quadrant, and a pivotal sliding connection between said tool slide and said bar, substantially as set forth.

In testimony whereof I have signed my name to this specification in the presence of two subscribing witnesses.

WILLIAM NUNN VENNER.

Witnesses:
V. JENSEN,
H. D. JAMESON.